US007397478B2

(12) United States Patent
Jiang

(10) Patent No.: US 7,397,478 B2
(45) Date of Patent: Jul. 8, 2008

(54) VARIOUS APPARATUSES AND METHODS FOR SWITCHING BETWEEN BUFFERS USING A VIDEO FRAME BUFFER FLIP QUEUE

(75) Inventor: Hong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 11/240,892

(22) Filed: Sep. 29, 2005

(65) Prior Publication Data

US 2007/0070074 A1 Mar. 29, 2007

(51) Int. Cl.

| | |
|---|---|
| ***G06F 13/00*** | (2006.01) |
| ***G06F 12/00*** | (2006.01) |
| ***G06F 13/372*** | (2006.01) |
| ***G09G 5/36*** | (2006.01) |
| ***G06T 15/00*** | (2006.01) |
| ***G06T 15/30*** | (2006.01) |

(52) U.S. Cl. ....................... 345/545; 345/422; 345/522; 345/536; 345/547; 711/143; 382/305

(58) Field of Classification Search ......... 345/501–503, 345/422, 522, 530–547; 382/303–305; 711/100, 711/143, 156, 159; 4/156, 159
See application file for complete search history.

(56) References Cited

U.S. PATENT DOCUMENTS 5,933,155 A * 8/1999 Akeley ....................... 345/536
6,100,906 A 8/2000 Asaro et al.
6,320,619 B1 11/2001 Jiang
6,459,737 B1 10/2002 Jiang
6,614,441 B1 9/2003 Jiang et al.
6,670,996 B2 12/2003 Jiang
6,774,950 B1 8/2004 Jiang
2002/0109786 A1 8/2002 Chae
2006/0023079 A1* 2/2006 Sugitani .................. 348/222.1
2006/0132491 A1* 6/2006 Riach et al. ................. 345/505

FOREIGN PATENT DOCUMENTS

WO WO 9957645 11/1999

OTHER PUBLICATIONS

International Search Report and Written Opinion for International Application No.: PCT/US2006/037632, date mailed: Mar. 26, 2007, pp. 11 total.

* cited by examiner

*Primary Examiner*—Wesner Sajous
(74) *Attorney, Agent, or Firm*—Blakelt, Sokoloff, Taylor & Zafman LLP

(57) ABSTRACT

A method, apparatus, and system are described in which a signal is generated to inhibit the execution of flip commands that cause a flip between buffers of a frame buffer. One or more of the flip commands and their associated instruction pointers may be preloaded into a frame buffer flip queue prior to removing the signal inhibiting the execution of the flip commands.

18 Claims, 8 Drawing Sheets

Prior Art

FIG. 1 Flip with a flip register

| | Display Buffer | Flip Register |
|---|---|---|
| T1 | ... | Ptr 0 |
| T2 | Ptr 0 | Ptr 0 |
| T3 | Ptr 0 | Ptr 1 |
| T4 | Ptr 1 | Ptr 1 |
| T5 | Ptr 1 | Ptr 1 |
| T6 | Ptr 1 | Ptr 2 |
| T7 | Ptr 2 | Ptr 2 |
| T8 | Ptr 2 | Ptr 3 |
| T9 | Ptr 2 | Ptr 4 |
| T10 | Ptr 4 | Ptr 4 |

Prior Art

FIG. 2

FIG. 4 Flip with a synchronized flip queue 534 536 538

506

| | Queue entry 1 | Queue entry 2 | Queue entry 3 |
|---|---|---|---|
| T-1 | Ptr 1 | | |
| T0 | Ptr 1 | | |
| T1 | Ptr 1 | Ptr 2 | |
| T2 | Ptr 1 | Ptr 2 | |
| T3 | Ptr 2 | Ptr 3 | |
| T4 | Ptr 2 | Ptr 3 | |
| T5 | Ptr 3 | | |
| T6 | Ptr 3 | Ptr 4 | |
| T7 | Ptr 3 | Ptr 4 | Ptr 5 |
| T8 | Ptr 4 | Ptr 5 | |
| T9 | Ptr 4 | Ptr 5 | Ptr 6 |
| T10 | Ptr 5 | Ptr 6 | |

FIG. 5

FIG. 6 Flip with a flip register

| | 734 | 736 | 738 | 740 |
|---|---|---|---|---|
| | Queue entry 1 | Queue entry 2 | Queue entry 3 | Queue entry 4 |
| T1 | - | | | |
| T2 | - | | | |
| T3 | Ptr 1 | Ptr 2 | Ptr 3 | Ptr 4 |
| T4 | Ptr 1 | Ptr 2 | Ptr 3 | Ptr 4 |
| T5 | Ptr 2 | Ptr 3 | Ptr 4 | |
| T6 | Ptr 3 | Ptr 4 | | |
| T7 | Ptr 4 | | | |
| T8 | Ptr 4 | Ptr 5 | Ptr 6 | Ptr 7 |
| T9 | Ptr 5 | Ptr 6 | Ptr 7 | |
| T10 | Ptr 6 | Ptr 7 | | |
| T11 | Ptr 7 | | | |

706

FIG. 7

VARIOUS APPARATUSES AND METHODS FOR SWITCHING BETWEEN BUFFERS USING A VIDEO FRAME BUFFER FLIP QUEUE

FIELD

Aspects of embodiments of the invention relate to the field of video graphics display process; and more specifically, an aspect relates to the switching between buffers using a video frame buffer flip queue.

BACKGROUND

For graphics/multimedia applications, video data (i.e., audio and visual data) may be captured by a chipset from a video source using general video capturing techniques. The captured video data is presented for display on a display monitor. During active video re-animation, a series of images may be displayed on a display monitor in sequential order. Video data may be sequentially stored in a pair of buffers. Software is typically provided to drive video hardware specifically configured to sequentially store images in those buffers and "flip" display contents from one image to another. The way to control the switch from one buffer to another is called a buffer flip. The flipping of display contents of images may be activated through a software interrupt service provided by an operating systems (OS) such as Microsoft Windows™.

The flip may be synchronized to the display Vertical Synchronization (VSYNC) signal or not. As non-synchronized flip may cause tearing artifacts, most flips are synchronized to the display VSYNC. Delays and drops of the content in a video frame buffer may happen from time to time as shown in FIG. 1. The drops and delays cause jitter and other visual defects on images presented on the display monitor. The top time line of the graph marks the flip commands and their associated instruction pointers. The bottom time line marks the occurrence of each display VSYNC pulse. Arrow points to the VSYNC for a given flip. FIG. 2 indicates a frame buffer flip register with corresponding entries to the timeline of FIG. 1.

Every time a buffer flip command (also known as a buffer flip instruction) comes in from the software, the associated instruction pointer is stored as an entry in the frame buffer flip queue. Generally, each time a VSYNC pulse occurs the instruction pointer entries in the frame buffer flip queue advance causing an entry lower in depth to overwrite the top entry in depth. The instruction pointer indicates the location for the video data to be displayed on the video monitor changes as well as the particular frame buffer that stores the rendered video data.

However, as FIG. 1 indicates between times T4 through T7, delays in displaying the content in a buffer of the frame buffer may occur to cause defects in the presented video display. The flip command with an associated instruction pointer number 2 (Ptr 2) is loaded into the frame buffer flip queue just after the VSYNC pulse at time T5. The rendered video data displayed at T4 does not change until two VSYNC pulses later at T7.

Moreover, as FIG. 1 indicates between times T7 through T10, the content in a buffer of the frame buffer may be dropped entirely and not presented on the display monitor. The flip command with an associated instruction pointer number 3 (Ptr 3) is loaded into the frame buffer flip queue just after the VSYNC pulse at time T7. The flip command with an associated instruction pointer number 4 (Ptr 4) is loaded into the frame buffer flip queue after the VSYNC pulse at time T7 and before the next successive VSYNC pulse at time T10. The content in a buffer of the frame buffer associated with Ptr 3 is dropped/overwritten without being presented on the display monitor.

Note, in a previous implementation the video graphics display process, the software or hardware typically poll to see if a flip is complete. If flip delay or frame drop occurs with software polling, that may also mean significant CPU cycles spent from that point forward to synchronize the video display process. Also, the frame buffer flip queue may differ from a register storing one entry and possibly a status flag.

BRIEF DESCRIPTION OF THE DRAWINGS

The drawings refer to embodiments of the invention in which:

FIG. 2 illustrates a block diagram of a frame buffer flip queue having a depth of two entries and corresponds to the entries from the timeline of FIG. 1.

FIG. 5 illustrates a block diagram of an embodiment of a frame buffer flip queue having a depth of three or more entries and corresponds to the entries from the timeline of FIG. 4.

FIG. 7 illustrates a block diagram of an embodiment of a frame buffer flip queue having a depth of four or more entries and corresponds to the entries from the timeline of FIG. 6.

Figure 1:
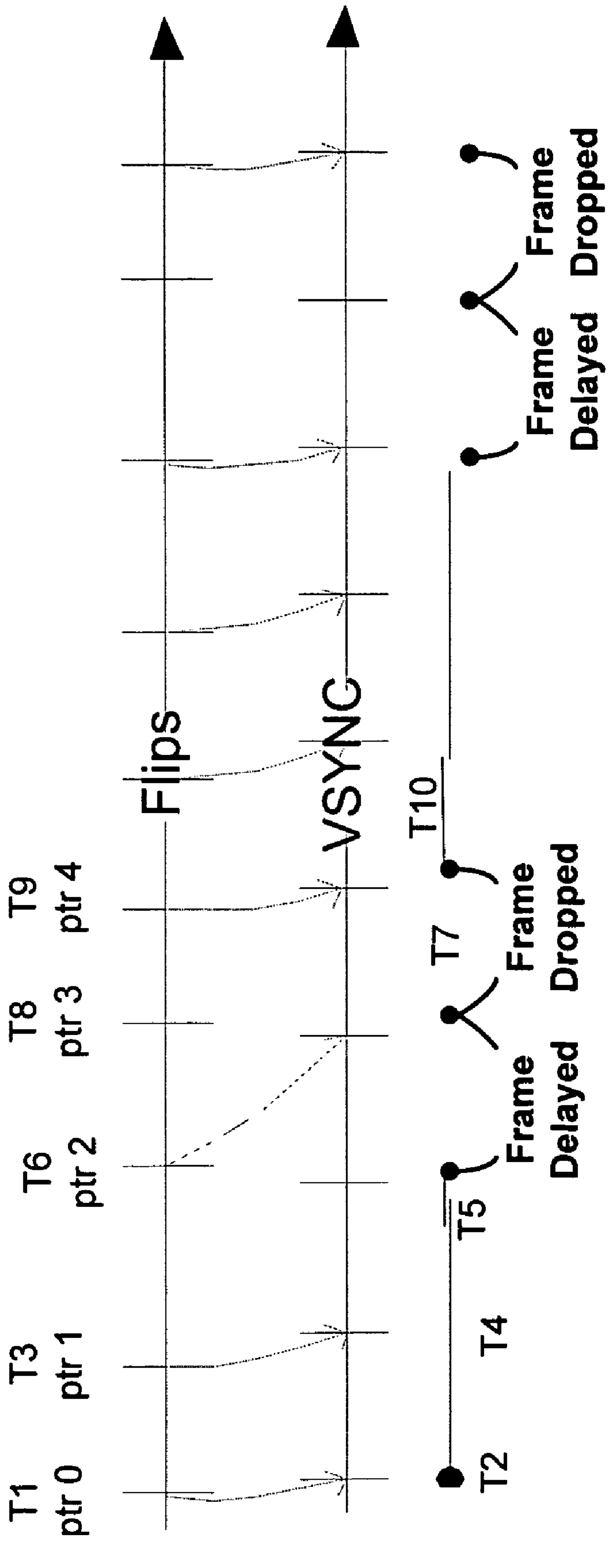
FIG. 1 illustrates a graph of an example number of flip commands and their associated instruction pointers verses the occurrence of each display VSYNC pulse.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of video commands, etc., in order to provide a thorough understanding of the embodiments of the invention. It will be apparent, however, to one of ordinary skill in the art that the embodiments of the invention may be practiced without these specific details. The specific numeric reference should not be interpreted as a literal sequential order but rather interpreted that the first buffer is different from a second buffer. Thus, the specific details set forth are merely exemplary. The specific details may be varied from and still be contemplated to be within the spirit and scope of the present invention.

In general, various methods, apparatuses, and systems are described in which a signal is generated to inhibit the execution of flip commands that cause a flip between buffers of a frame buffer. One or more of the flip commands and their associated instruction pointers may be preloaded into a frame buffer flip queue prior to removing the signal inhibiting the execution of the flip commands.

Figure 3:
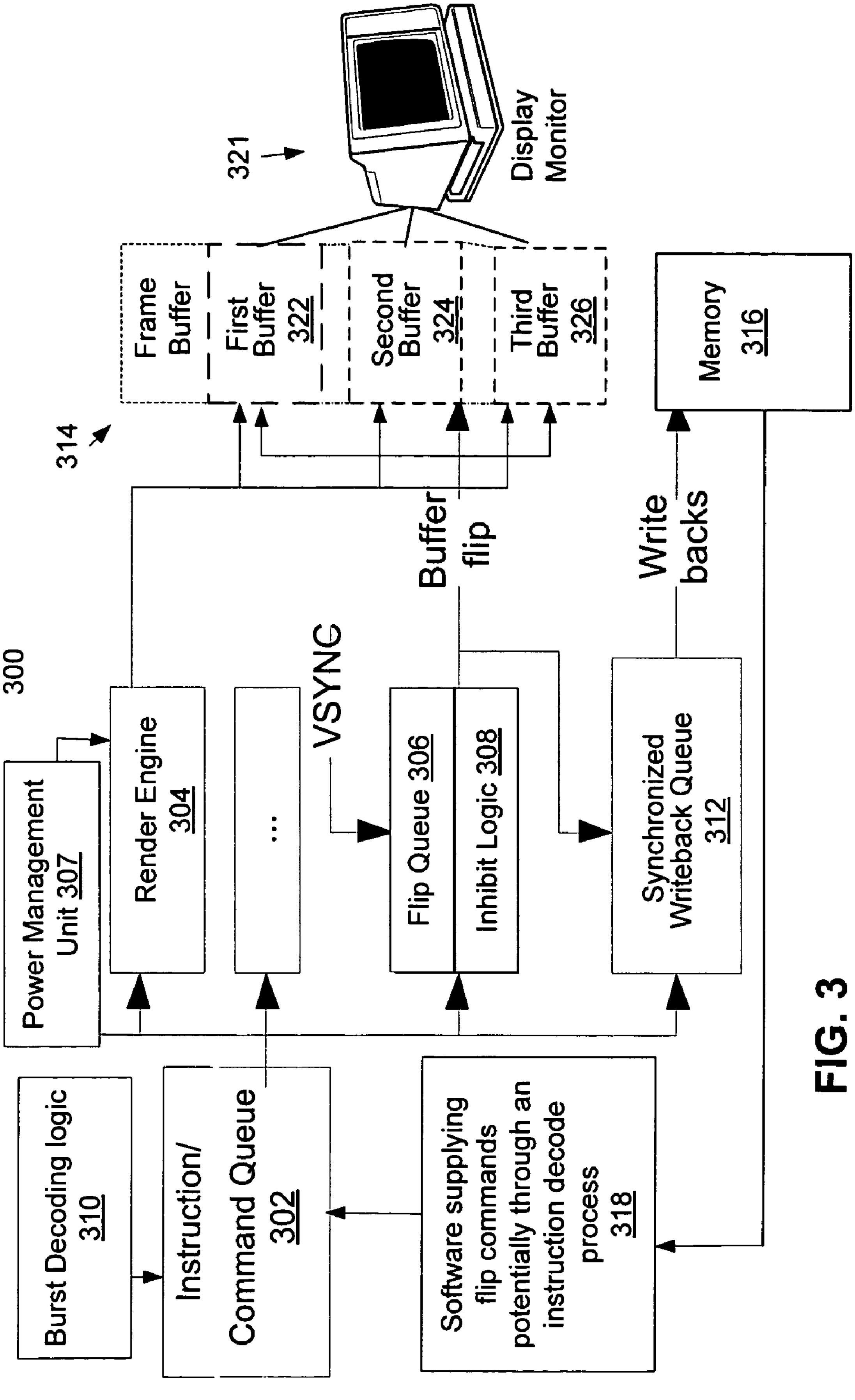
FIG. 3 illustrates a block diagram of an embodiment of the inhibit logic coupled to a frame buffer.

FIG. 3 illustrates a block diagram of an embodiment of the inhibit logic coupled to a frame buffer. The computing system 300 may include a command queue 302, one or more rendering engines 304, a frame buffer flip queue 306, a block of inhibit logic 308, a block of burst instruction decode logic 310, a synchronized writeback queue 312, a frame buffer 314, a memory 316, and other similar components.

Software 318, such as graphics application programs, may supply one or more video instruction streams to the rendering engine 304 via an instruction decode pipeline. For example, a first graphics application program may send a graphics driver program instructions and send the instruction streams containing the graphics instructions, including the state variable settings and flip command pointer settings, to an instruction/command queue 302.

The decoded video data and instructions are retrieved by the rendering engine 304 for processing and eventual display on the display monitor 321. The rendering engine 304 decodes specific instructions from the instruction stream to find out what information the instruction contains (e.g., a state variable change to apply or a primitive to be rendered). The rendering engine 304 may be controlled via a set of rendering state variables. These state variables are known collectively as the rendering context and can be supplied by the instruction stream. The rendering state variables control specific aspects of the graphics rendering process, such as object color, texture, texture application modes, etc. A primitive instruction directs the rendering engine 304 as to the shapes to draw and the location and dimensions to attribute to those shapes.

The rendering engine 304 may include logic and circuitry for a 3D engine, a 2D engine, and a video engine. The rendering engine 304 may further include, but not limited to, a video capture engine for capturing decoded video data from a video source (e.g., a hardware device such as a video stream decoder or software 318 such as an instruction stream) and sending the decoded video data for storage in the frame buffer 314. The rendering engine 304 may further include a display engine for retrieving video data from the frame buffer 314 to illustrate a visual display on the display monitor 321.

The rendering engine 304 controls the concurrent operation of capturing video data and displaying the same display monitor 321

In an embodiment, a memory controller (not shown) and the rendering engine 304 may be integrated as a single graphics and memory controller hub chipset (GMCH) that includes dedicated multi-media engines executing in parallel to deliver high performance 3-dimensional (3D) and 2-dimensional (2D) video capabilities.

As discussed, a frame buffer 314 may be coupled to the rendering engine 304 for buffering the data from the rendering engine 304 for a visual display of video images on the display monitor 321. The frame buffer 314 may contain at least three distinct buffers, 322-326.

During active video or animation, a series of images need to be displayed on the display monitor 321 in sequential order. The rendering engine 304 renders data in a first frame of a video stream in a first buffer 322 while displaying the data in a second buffer 324 in a second frame of a video stream onto the display monitor 321. In order to prevent tearing artifacts from appearing on the display monitor 321, the video data is sequentially stored in multiple buffers. Each video buffer is overwritten after the image has been displayed on the display monitor 321. The rendering engine 304 with help from the synchronized writeback queue 312 may synchronize the reading of video data to the blanking intervals of the display monitor 321 and move from one buffer to the next buffer in the frame buffer 314 in order to provide a visual display of consecutive images on the display monitor 321.

As discussed, a flip mechanism between the buffers 322-326 in the frame buffer 314 may be implemented with instructions coming from the software 318 requesting the task of flipping the video buffers of the frame buffer 314. Alternatively, the flip mechanism may be implemented in logic within the rendering engine 304 to automate the concurrent operation of video capture and display on the display monitor 321.

The inhibit logic 308 couples to the frame buffer 314 that includes the one or more buffers 322-326. The frame buffer flip queue 306 couples to the inhibit logic 308 and to the frame buffer 314. The frame buffer flip queue 306 has a depth to store three or more entries. The frame buffer flip queue 306 may have a depth that equals the number of flip commands in a burst instruction. The inhibit logic 308 inhibits the one or more buffers 322-326 from switching on a Vertical Synchronization (VSYNC) pulse the data being illustrated on the display monitor 321. The inhibit logic 308 also inhibits the frame buffer flip queue 306 from advancing pointer entries on the VSYNC pulse. The VSYNC signal used to direct the display monitor 321 when to draw the next display frame (i.e. set of vertical lines). The time it takes between drawing each display frame to occur on the display monitor 321 is often synonymous with refresh rate and may be measured in Hertz (Hz).

The synchronized writeback queue 312 communicates to the software 318 the timing and the identity information regarding the flip between the one or more buffers 322-326 in the frame buffer 314. The synchronized writeback queue 312 generates a notification of when the flip between the one or more buffers 322-326 is complete. The synchronized writeback queue 312 generates this notification each time a completed flip occurs. The synchronized writeback queue 312 may provide this timing information to prevent the software 318 having to poll when a flip has been completed. Further, the synchronized writeback queue 312 may provide this timing information to synchronize the source-flip frequency to exactly equal to the display monitor VSYNC frequency. The source-flip frequency equaling the display monitor VSYNC frequency creates a software or hardware Genlock condition. Alternatively, the synchronization writeback queue may communicate with a hardware unit such as Render engine to create a hardware Genlock condition.

Figure 4:
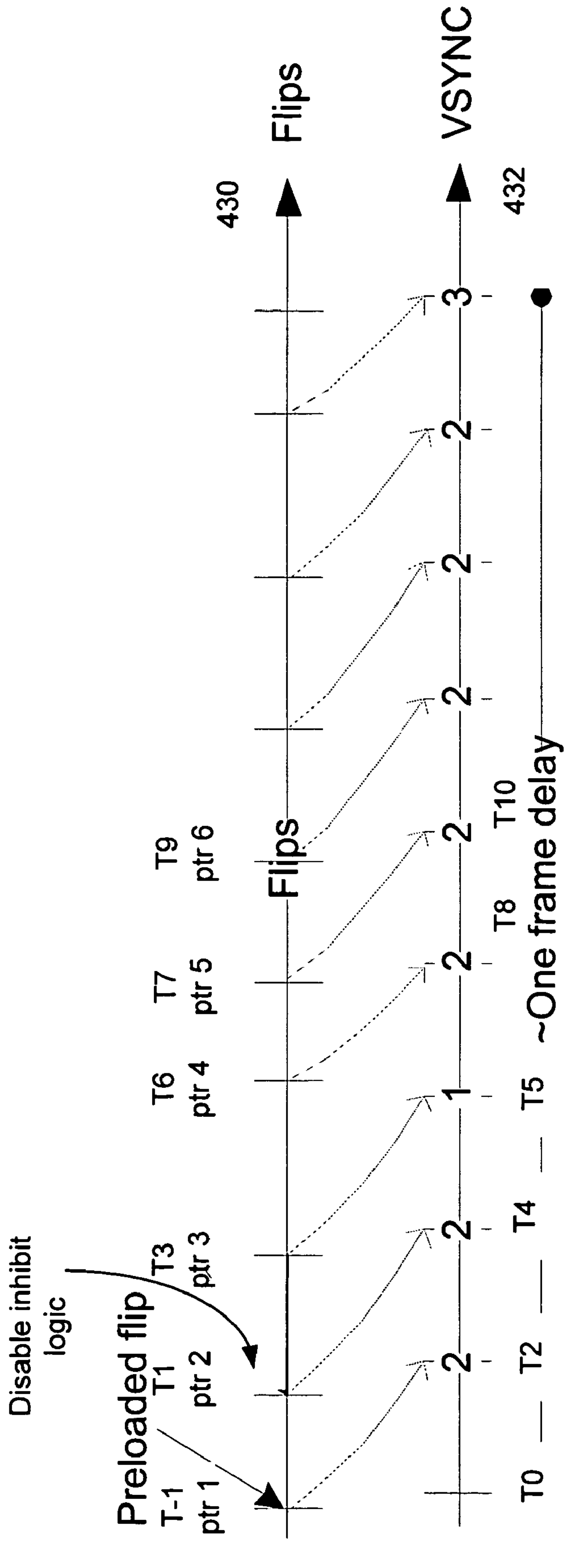
FIG. 4 illustrates a graph of an embodiment of flip commands and their associated instruction pointers verses the occurrence of each display VSYNC pulse.

FIG. 4 illustrates a graph of an embodiment of flip commands and their associated instruction pointers verses the occurrence of each display VSYNC pulse. The top time line 430 of the graph marks the flip commands and their associated instruction pointers. The bottom time line 432 of the graph marks the occurrence of each display VSYNC pulse. Arrow points to the VSYNC for a given flip between buffers in the frame buffer. FIG. 5 illustrates a block diagram of an embodiment of a frame buffer flip queue 506 having a depth of three or more entries 534-538 and corresponds to the entries from the timeline of FIG. 4.

Referring to FIGS. 4 and 5, the inhibit logic causes the frame buffer flip queue 506 to have a pre-loading capability. The display frame buffer flip queue 506 with pre-loading capability has a depth to store three or more entries 534-538 prior to advancing any of these entries. The display frame buffer flip queue 506 may improve the video quality by not having any video frame drops. Also, having a preset number of preloaded instruction pointers in the queue and rendered video data frame buffers reduces the computing system's dependency on the OS software to deliver the video instructions on a real time as needed basis. The OS may prioritize the data but still not arbitrate and schedule the video instructions in time to support a real time application based on other programs occupying the OS at that current time.

The display frame buffer flip queue 506 can be initialized as in-active but with the ability to load in buffer flips commands and their associated instruction pointers. At time T-1, a first buffer flip command and its associated instruction pointer (Ptr 1) are loaded into the frame buffer flip queue 506.

The inhibit logic inhibits the frame buffer from switching between the one or more buffers. The inhibit logic inhibits the frame buffer flip queue 506 from advancing pointer entries on a VSYNC pulse to allow the frame buffer flip queue 506 to be preloaded with one or more buffer flips commands and associated instruction pointers. If the display frame buffer flip queue 506 is still in an in-active (inhibit) mode, the display VSYNC signal does not trigger a buffer flip. At time T0, a VSYNC pulse occurs and a flip command is present in the frame buffer flip queue 506 but the display monitor does not flip to displaying the video data in the next sequential buffer because the inhibit logic inhibits the frame buffer from switching between the one or more buffers.

Thus, the frame buffer flip queue 506 can be preloaded with one or more buffer flips commands and associated instruction pointers. At time T1, a second buffer flip command and its associated instruction pointer (Ptr 2) are loaded into the display frame buffer flip queue 506.

The state of the display frame buffer flip queue 506 may be changed to active, either by a new flip command that carries the state change signal or other means (i.e. the software instructions communicate a command instruction to disable the inhibit logic). Thus, the inhibit logic may be configured to receive an instruction from software to disable an inhibit signal to the frame buffer flip queue and the frame buffer generated by the inhibit logic. When the state of the display frame buffer flip queue 506 changes, then the top buffer flip command and associated instruction pointer in the display frame buffer flip queue 506 will be serviced at the next display VSYNC pulse.

For example, at time T2, the first buffer flip command is executed and the second buffer flip command is then advanced in the frame buffer flip queue 506 to the top queue entry. The top buffer flip command/instruction and associated instruction pointer (Ptr 2) in the display frame buffer flip queue 506 is executed on the next display VSYNC pulse (at T4).

The amount of preloaded flip commands may regulate the delay between a flip event and when the actual flip happens between the buffers of the frame buffer. The regulation occurs by preloading enough buffer flip commands to cause switching between buffers to occur on each successive VSYNC pulse. The amount of preloaded buffer flip command may be determined by each graphics application supplying the video graphics data. Graphics applications with anticipated larger flip jitter occurrences can increase the number of preloaded flip commands before disabling the inhibit logic.

This process of loading buffer flip commands and its associated instruction pointer in the frame buffer flip queue 506 and then executing the buffer flip commands at the top of the frame buffer flip queue 506 on the next display VSYNC pulse continues through out a session to prevent a frame drop from the video stream caused by the flip jitter. As shown, there will be no frame drops (i.e. video data being overwritten without ever being displayed) caused by the flip jitter because no buffer flip command is overwritten prior to being executed. Enough storage depth exists in the frame buffer flip queue 506 to store equal to or more than all of the anticipated number of buffer flip commands awaiting execution at a given time.

Overall, every time a buffer flip command/instruction comes in from the software, then the associated instruction pointer is stored as an entry in the frame buffer flip queue 506. Each time a VSYNC pulse comes when the inhibit logic is disabled, then the instruction pointer entries in the frame buffer flip queue 506 advance causing an entry lower in depth to overwrite the top entry in depth. The instruction pointer indicates a storage location for the video data to be displayed on the video monitor as well as the particular frame buffer storing that rendered video data.

Figure 6:
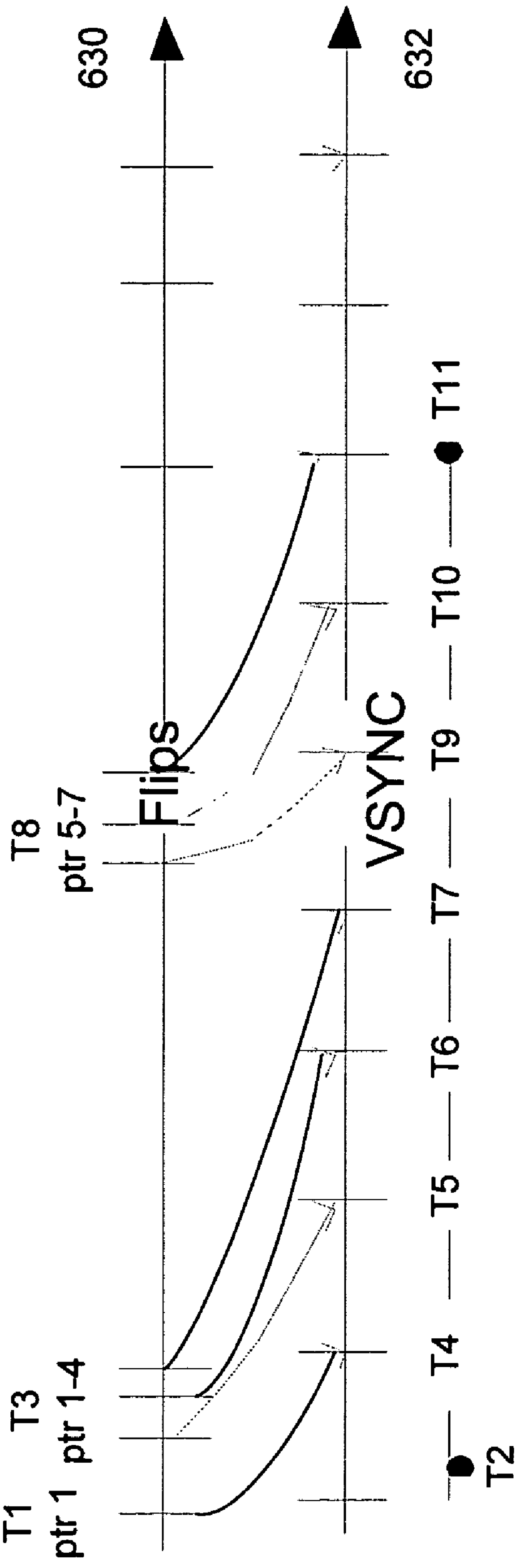
FIG. 6 illustrates a graph of an embodiment of flip commands and their associated instruction pointers in a burst instruction verses the occurrence of each display VSYNC pulse.

FIG. 6 illustrates a graph of an embodiment of flip commands and their associated instruction pointers in a burst instruction verses the occurrence of each display VSYNC pulse. The top time line 630 of the graph marks the flip commands and their associated instruction pointers. The bottom time line 632 of the graph marks the occurrence of each display VSYNC pulse. FIG. 7 illustrates a block diagram of an embodiment of a frame buffer flip queue 706 having a depth of four or more entries 734-740 and corresponds to the entries from the timeline of FIG. 6.

Referring to FIGS. 6 and 7, the software may enqueue multiple frames of processing (rendering) with associated display flip commands (inter-mixed) into the command queue by sending a single burst instruction containing three or more flip commands and associated instruction pointers. The instruction stream may contain one or more of these burst instructions. The software may send an example burst instruction containing four buffer flip commands with their associated instruction pointers. At time T1, ptr 1 an instruction is received in the queue. At time T2, as the inhibit logic is enabled, however a flip doesn't happen until the next Vsync pulse. At time T3, the inhibit logic has been disabled and the command queue is more fully loaded with the multiple flip commands ptr's 2-4.

The burst decoding logic may perform computations to determine information such as the number of flip commands, the location of the instruction pointers associated with each flip command, etc. When these computations are done, a sequence of flips is en-queued to the frame buffer flip queue that will occur at different VSYNC pulse times.

The rendering engine may render the video data associated with those example one buffer flip commands followed by burst of three buffer flip commands. The rendering engine may store the rendered video data in a corresponding of buffer in the frame buffer. Each distinct buffer stores a different set of rendered data. Thus, the example frame buffer would contain at least four distinct buffers to store the rendered video data of the four buffer flip commands. At times T4-T7, flips between the buffers occur.

Referring to FIG. 3, Power Management logic 307 receives a control input from the Command Queue 302 and send control signals to Render Engine(s) 304. In many cases, the sending of burst instructions and corresponding burst computation allows longer power saving duration times and therefore going into deeper power saving states.

Referring to FIG. 7, the frame buffer flip queue 706 may be loaded up with multiple flip commands in one action to allow aggressive power management. The rendering engine and other graphics components may rapidly render the video data associated with all of the burst instructions in the first frame of time and then power down for multiple frames of time. Thus, the rendering engine may enter a reduced power consumption state, such as a sleep state, during at least one of the frames associated with the flip commands from the burst instruction.

The large number of buffers and the large depth of the frame buffer flip queue 706 allow the graphic rendering engine to go to sleep for an extended number of clock cycles. Thus, the rendering engine renders and stores enough video data to fill the four frame buffers in, for example, the time period of a first VSYNC pulse at T2 to the second VSYNC pulse at T4. The frame buffer flip queue 706 stores flip commands with associated instruction pointers for the four flips between the buffers in the frame buffer. The above preloading allows the graphic rendering engine to enter a sleep mode for the time period over the next three VSYNC pulses at T5 to T7.

Note, the frame buffer flip queue 706 by having a depth to store four or more instruction pointer entries is configured to receive a burst instruction carrying four or more flip commands and associated instruction pointers.

In this example, at time T8, a second burst command may be received by the command queue containing an example three flip commands and associated instruction pointers. The burst instruction is decoded, the rendering engine renders and stores and the video data, and the frame buffer flip queue 706 stores flip commands with associated instruction pointers.

As discussed, the synchronized writeback queue communicates to the software the timing and the identity information regarding the flip between frame buffers. The synchronized writeback queue may generate a notification of when the flip between frame buffers is complete. This timing information may be used to synchronize the source-flip frequency to exactly equal the display monitor Vertical Synchronization frequency. This is a software Genlock.

The write back queue may be used for software GenLock by having a routine in an Application Program Interface (API) poll the information from the write back queue to determine the rate at which the flips are occurring and then determining the rate at which the VSYNC pulses occur. The routine will speed up or slow down the rate at which the flip instructions are generated to match the VSYNC rate.

The synchronized writeback queue couples to the memory. The synchronized writeback queue functions to communicate with the software, via the use of general memory, frame buffer flip information such as a time stamp of when flips occur and the identity of which the frame buffers involved in the flip. By employing Direct Memory Access (DMA), the synchronized writeback queue allows a reduced amount of software polls to determine when a VSYNC pulse has occurred. The circuitry is configured to transfers data from memory to another component, such as memory or software, without using the CPU.

Thus, on the delivery side, the software writes buffer flip commands to the command/instruction queue. On the feedback side, the software reads data from memory associated with the synchronized writeback queue.

In an embodiment, the hardware logic tells the frame buffer flip queue 706 that a particular frame buffer has flipped based on the instruction pointer and to advance instruction pointers entries stored in the frame buffer flip queue 706 upon each detected VSYNC pulse.

This synchronized frame buffer flip queue 706 works perfectly if the source-flip frequency exactly equals to the display frequency. However, as the source may be driven by a different clock (such as a software multi-media clock) than the display monitor clock. The two may not be synchronized. There may be differences such as drifting. Techniques such as GenLock may be needed. Clock synchronization may be employed if the display VSYNC frequency can be measured. The display monitor Vertical Synchronization frequency may be measured by one of several ways.

The display monitor Vertical Synchronization frequency may be directly read by software.

However, it can be more accurately delivered to the software when VSYNC timing information can be associated with the flip events. The display monitor Vertical Synchronization frequency can be delivered to the OS software when VSYNC timing information can be associated with the flip events. The synchronized writeback queue may communicate the when with a time stamp of the flip between buffers occurs and tag events to indicate both the identity of which frame buffer switched being service and the identity of which frame buffer is currently being service.

Also, the source flip jitter measurement can also be provided if the flip command arrival time can also be reported back. The display monitor Vertical Synchronization frequency can also be provided when the flip command arrival time is reported back to a synchronization controller.

Thus, the synchronized writeback queue may communicate the difference between the rate of the arrival of flip instructions/commands and the VSYNC pulses for software GenLock. A routine in the software then increases or decreases the rate of the arrival of flip instructions/commands to achieve a substantial match between the two rates i.e. a software Genlock. The Genlock account for timing mismatches including those caused by clock drift.

Buffer flip jitter can also be intentionally introduced. One example, some composition and presentation computations may be more software friendly to be done at frame boundary (such as 30 frames per second) not at field boundary (e.g. 60 fps). It is more software friendly if the post processing is done at frame interval instead of field interval. This also saves power.

In an embodiment, the display frame buffer flip queue 706 is coupled with a synchronized writeback queue, allowing timing information writeback to the software in software implementation, and to the rendering engine in a hardware implementation. The information includes when and which frame buffer has been flipped to the active buffer supplying rendered video data to the video display monitor.

Figure 8:
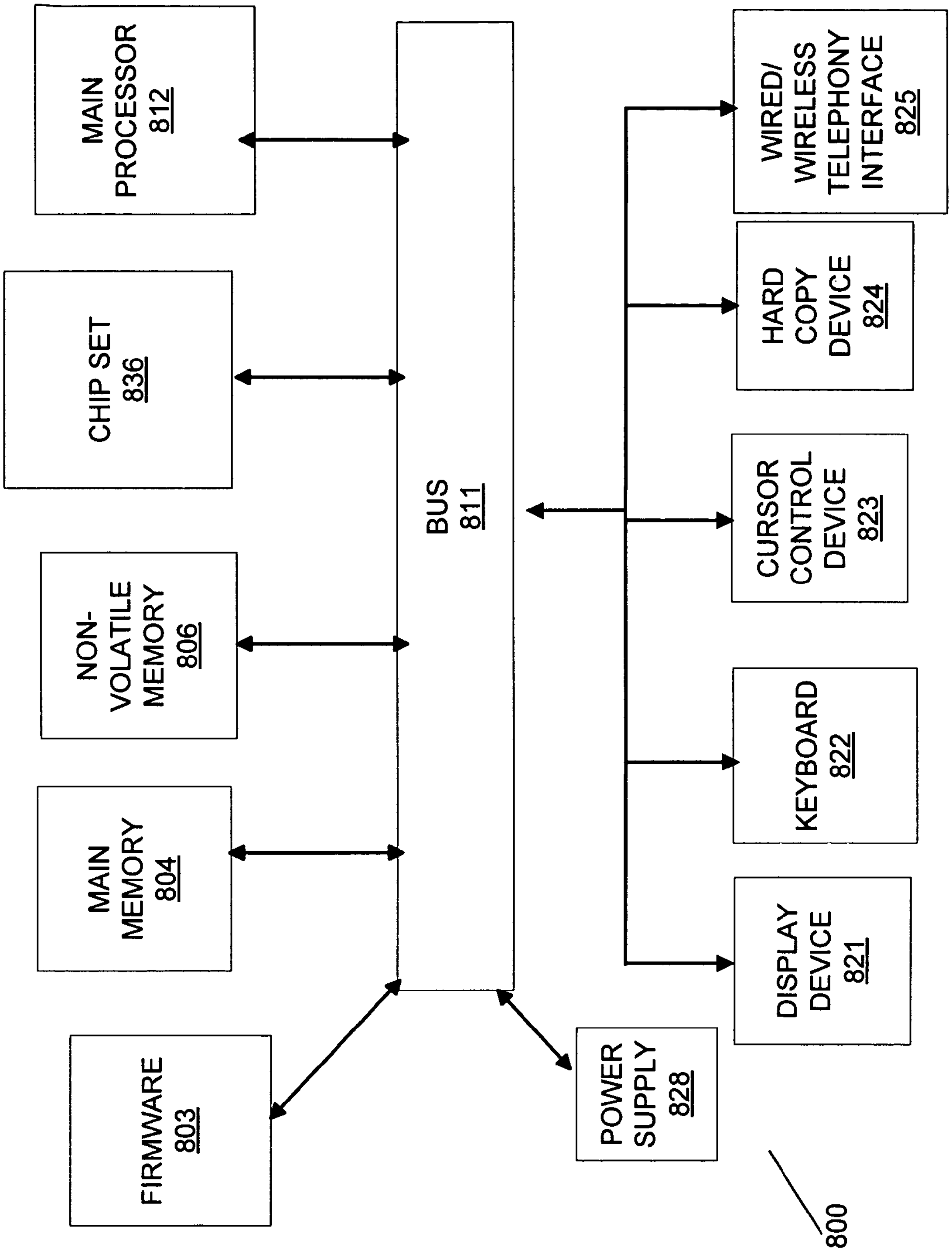
FIG. 8 illustrates a block diagram of an example computer system that may use an embodiment of a frame buffer flip queue and its associated inhibit logic.

FIG. 8 illustrates a block diagram of an example computer system that may use an embodiment of a frame buffer flip queue with pre-loading capability and associated inhibit logic. In one embodiment, computer system 800 comprises a communication mechanism or bus 811 for communicating information, and an integrated circuit component such as a main processing unit 812 coupled with bus 811 for processing information. One or more of the components or devices in the computer system 800 such as a chip set 836 may use an embodiment of the frame buffer flip queue with pre-loading capability and associated inhibit logic as well as the rendering engine. The main processing unit 812 may consist of one or more processor cores working together as a unit.

Computer system 800 further comprises a random access memory (RAM) or other dynamic storage device 804 (referred to as main memory) coupled to bus 811 for storing information and instructions to be executed by main processing unit 812. Main memory 804 also may be used for storing temporary variables or other intermediate information during execution of instructions by main processing unit 812.

Firmware 803 may be a combination of software and hardware, such as Electronically Programmable Read-Only Memory (EPROM) that has the operations for the routine recorded on the EPROM. The firmware 803 may embed foundation code, basic input/output system code (BIOS), or other similar code. The firmware 803 may make it possible for the computer system 800 to boot itself.

Computer system 800 also comprises a read-only memory (ROM) and/or other static storage device 806 coupled to bus 811 for storing static information and instructions for main processing unit 812. The static storage device 806 may store OS level and application level software.

Computer system 800 may further be coupled to a display device 821, such as a cathode ray tube (CRT) or liquid crystal display (LCD), coupled to bus 811 for displaying information to a computer user. A chipset may interface with the display device 821.

An alphanumeric input device (keyboard) 822, including alphanumeric and other keys, may also be coupled to bus 811 for communicating information and command selections to main processing unit 812. An additional user input device is cursor control device 823, such as a mouse, trackball, trackpad, stylus, or cursor direction keys, coupled to bus 811 for communicating direction information and command selections to main processing unit 812, and for controlling cursor movement on a display device 821. A chipset may interface with the input output devices.

Another device that may be coupled to bus 811 is a hard copy device 824, which may be used for printing instructions, data, or other information on a medium such as paper, film, or similar types of media. Furthermore, a sound recording and playback device, such as a speaker and/or microphone (not shown) may optionally be coupled to bus 811 for audio interfacing with computer system 800. Another device that may be coupled to bus 811 is a wired/wireless communication capability 825.

The computing device may be for example a desk top computer, lap top computer, a personal digital assistant, a cellular phone, or other similar device.

In one embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. For example, the logic described above may be implemented with hardware Boolean logic in combination with other electronic components configured to achieve a specific purpose, code written in software to achieve a specific purpose, firmware, any combination of the three and similar implementation techniques. The Vsync pulse in analog or digital form is used to synchronize the frame. Other frame buffer output trigger events could implement the same function. For example, the output of the frame buffer may be sent to a DAC (Digital to Analog Converter to drive a display screen like CRT or LCD. Or the output of the frame buffer may be sent to a digital video output bus like DVI (Digital Video Interface) or HDMI. The render engine may be a render engine, a video decoding engine or a video processing engine. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:

1. An apparatus, comprising:

inhibit logic coupled to a frame buffer that includes one or more buffers;

a frame buffer flip queue having a depth to store three or more entries and that is coupled to the inhibit logic as well as to the frame buffer, wherein the inhibit logic is configured to inhibit the one or more buffers from switching on a vertical synchronization pulse and also configured to inhibit the frame buffer flip queue from advancing instruction pointer entries on the vertical synchronization pulse; and a writeback queue coupled to the inhibit logic and the frame buffer flip queue to communicate to software a timing information and an identity information regarding a flip between the one or more buffers.

2. The apparatus of claim 1, wherein the frame buffer consists of at least three distinct buffers.

3. The apparatus of claim 1, wherein the depth of the frame buffer flip queue equals or exceeds a number of flip commands in a burst instruction.

4. The apparatus of claim 1, further comprising a writeback queue to generate a notification of when a flip between the one or more buffers is complete.

5. The apparatus of claim 1, further comprising the writeback queue to communicate timing information to synchronize a source-flip frequency to exactly equal a display monitor vertical synchronization frequency.

6. The apparatus of claim 1, further comprising:

a command queue coupled to burst instruction decode logic and the frame buffet flip queue.

7. The apparatus of claim 6, wherein the burst instruction decode logic is configured to decode three or more flip commands associated with a burst instruction, and a rendering engine is configured to enter a reduced power consumption state during at least one video frame associated with the three or more flip commands from the burst instruction.

8. The apparatus of claim 1, wherein the inhibit logic is configured to receive an instruction from software to disable an inhibit signal to the frame buffer flip queue and the frame buffer generated by the inhibit logic.

9. The apparatus of claim 2, wherein the frame buffer is coupled to a rendering engine to buffer data from the rendering engine for a visual display of video images on a display monitor.

10. A method, comprising:

generating a signal to inhibit the execution of flip commands that cause a flip between buffers of a frame buffer;

generating a notification of when the flip between the buffers is complete; and preloading one or more of the flip commands and their associated instruction pointers into a queue prior to removing the signal inhibiting the execution of the flip commands.

11. The method of claim 10, further comprising:

inhibiting the execution of flip commands and advancement of their associated instruction pointers in the queue even if a vertical synchronization pulse occurs.

12. The method of claim 10, further comprising:

receiving multiple video frames of processing in a single burst instruction containing three or more flip commands and associated instruction pointers.

13. The method of claim 12, further comprising:

causing a rendering engine to enter a reduced power consumption state during at least one of the video frames associated with the flip commands from the single burst instruction.

14. The method of claim 10, further comprising:

rendering data in a first frame of a video stream in a first buffer while displaying the data in a second buffer of a second frame from the video stream onto a display monitor; and switching between the second buffer and another buffer to display the data on the display monitor based upon executing a flip command.

15. The method of claim 14, further comprising: generating a notification of when the flip between the frame buffers is complete.

16. A computing system, comprising:

a processor;

a bus connected to the processor; and a chipset coupled to the bus and a display monitor, and the chipset contains:

inhibit logic coupled to a frame buffer that includes one or more buffers;

a frame buffer flip queue having a depth to store three or more entries and tat is coupled to the inhibit logic as well as to the frame buffer, wherein the inhibit logic is configured to inhibit the one or more buffers from switching on a vertical synchronization pulse and also, configured to inhibit the frame buffer flip queue from advancing instruction pointer entries on the vertical synchronization pulse;

a writeback queue coupled to the inhibit logic and the frame buffer flip queue to communicate to software a timing information and an identity information regarding a flip between the one or more buffers; and a rendering engine coupled to the frame buffer to store rendered video data in the frame buffer for a visual display of video images on the display monitor.

17. The computing system of claim 16, wherein the depth of the frame buffer flip queue equals or exceeds a number of flip commands in a burst instruction.

18. The computing system of claim 16, further comprising the writeback queue to generate a notification of when a flip between the one or more buffers is complete.

* * * * *